(12) United States Patent
Tiberghien et al.

(10) Patent No.: US 7,766,393 B2
(45) Date of Patent: Aug. 3, 2010

(54) FEMALE COUPLING ELEMENT AND A COUPLING INCLUDING SUCH AN ELEMENT

(75) Inventors: Alain-Christophe Tiberghien, Sevrier (FR); Christophe Durieux, Gilly sur Isere (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 12/285,455

(22) Filed: Oct. 6, 2008

(65) Prior Publication Data

US 2009/0091124 A1   Apr. 9, 2009

(30) Foreign Application Priority Data

Oct. 8, 2007   (FR) .................................. 07 58146

(51) Int. Cl.
*F16L 39/00*   (2006.01)
(52) U.S. Cl. .......................... 285/317; 285/316; 285/81; 251/149.1
(58) Field of Classification Search ................. 285/316, 285/317, 81; 251/149.1
See application file for complete search history.

(56) References Cited

U.S. PATENT DOCUMENTS

| | | | |
|---|---|---|---|
| 2,344,740 A | * | 3/1944 | Shaff .......................... 285/316 |
| 3,468,562 A | | 9/1969 | Chow et al. |
| 3,873,062 A | * | 3/1975 | Johnson et al. .......... 251/149.6 |
| 4,219,222 A | | 8/1980 | Brusadin |
| 5,630,570 A | | 5/1997 | Lacroix et al. |
| 6,199,913 B1 | | 3/2001 | Wang |
| 6,467,816 B1 | * | 10/2002 | Huang ........................ 285/316 |
| 2005/0121906 A1 | | 6/2005 | Tiberghien et al. |
| 2007/0114794 A1 | * | 5/2007 | Frost et al. .................. 285/317 |

FOREIGN PATENT DOCUMENTS

| | | | |
|---|---|---|---|
| GB | 2036906 A | * | 7/1980 |
| JP | 2007321981 A | * | 12/2007 |

* cited by examiner

*Primary Examiner*—Aaron M Dunwoody
(74) *Attorney, Agent, or Firm*—Dowell & Dowell, P.C.

(57) ABSTRACT

A female element for a coupling that includes a body having a duct for receiving a male element along a coupling axis (X-X') and a locking member including a locking portion, a connecting portion, and a control portion, wherein the locking member extends along the axis (X-X') and is movable between a locked and an unlocked position, and wherein an annular element moves the locking member from the locked to the unlocked position and a resilient member urges the locking member to the locked position, and the female element includes a lateral guide for the connecting portion and the control portion, and a surface of the locking portion that is to come into contact with the male element generally having a shape of a portion of a surface of revolution and a width, in a circumferential direction, that is greater than a width of the control portion and the connecting portion.

15 Claims, 4 Drawing Sheets

FEMALE COUPLING ELEMENT AND A COUPLING INCLUDING SUCH AN ELEMENT

BACKGROUND OF THE INVENTION

1. Field of the Invention

The invention relates to a female coupling element including a locking member for locking a male element, the female coupling element extending along the coupling axis of the coupling. The invention also provides a coupling for joining together two fluid pipes, the coupling comprising both such a female element and a male element.

2. Brief Description of the Related Art

In certain fluid connection applications, in particular for hydraulic brake circuits of a motor vehicle, the coupling needs to present small radial size and the dimensions of the fluid ducts are relatively small. In order to ensure that the coupling is radially compact and in order to allow the male and female elements thereof to turn relative to each other, the members for locking the male element in the female element of a prior art coupling are generally constituted by balls housed in the female element. In the locked position, the balls are held between a housing in the female element and a corresponding cavity in the male element, such as an annular groove. The balls make point contact with those parts, such that when operating pressures are high, they transmit large loads via small areas. These loads lead to surface bruising in the ball-receiving cavity of the male element, and in the housing of the female element, thereby degrading the quality of the locking of the coupling.

U.S. 2,344,740 describes a locking member constituted by a cylindrical locking portion, a connecting portion, and a control portion. The connecting portion presents a width that is slightly greater than the width of the other portions. The locking member is subjected to combined movement in pivoting and in translation, thereby conserving relatively good radial compactness for the coupling.

Nevertheless contact between the male element and the locking portion takes place only along a linear segment, thereby giving rise, as with balls, to bruising of the contacting surfaces, and also to a relatively loose locking.

In addition, in order to allow the locking member to move, clearance is provided between the cylindrical locking portion and the housing that receives it in the coupling body. The connecting and control portions can move laterally around the axis of the coupling, thereby running the risk of putting the locking member off-axis. Such a sloping position can lead to jamming or even to breakage of the locking member during locking and unlocking movements of the coupling.

Similarly, EP-A-0 722 063 describes a coupling in which the contact area between the male element and the locking portion of the locking member is relatively small, thereby also leading to bruising of the contacting surfaces and limiting the strength of the locking.

SUMMARY OF THE INVENTION

The present invention seeks in particular to remedy those drawbacks, by proposing a compact female element of a coupling or connector that presents a long service life.

To this end, the invention provides a female element of a coupling comprising:

- a body having a duct for receiving a male element along a coupling axis of the coupling;
- at least one locking member presenting a locking portion suitable for establishing contact with the male element, a connecting portion, and a control portion connected to the locking portion via the connecting portion, the locking member extending generally along said axis and being movable with combined movement in pivoting and in translation along said axis between a locked position in which the locking portion is suitable for blocking the male element in the body along said axis, and an unlocked position in which the locking portion releases the passage for the male element in the duct;
- an annular element suitable for driving the locking member from the locked position to the unlocked position; and
- at least one resilient member for returning the locking member to the locked position.

The female element further comprises lateral guide means for guiding the or each connecting portion and/or the or each control portion during the movement of the locking member, the surface of the or each locking portion that is to come into contact with the male element presents generally the shape of a portion of a surface of revolution about said axis, and the width in a circumferential direction of the or each control portion and/or of the or each connecting portion is less than the width of the or each locking portion.

According to other characteristics of the invention, that are advantageous but optional, whether taken in isolation or in any technically feasible combination:

- said portion of the surface of revolution extends over a sector of angle greater than or equal to 30° relative to said axis;
- each locking portion generally presents the shape of a portion of a volume of revolution;
- said portion of a volume of revolution is formed by two frustoconical surfaces having respective generator lines that are inclined relative to said axis at respective angles lying in the range 30° to 60°;
- the or each locking portion presents a width that is greater than its thickness;
- the lateral faces of the or each locking portion diverge going away from said duct;
- the lateral faces of the or each connecting portion and/or of the or each control portion are mutually parallel;
- the body includes a through housing for the or each locking portion, and the or each control portion and the or each connecting portion are placed at the outer surface of the body of the female element;
- the or each housing includes a distal surface that is frustoconical and inclined relative to said axis by an angle lying in the range 30° to 60°;
- in the locked position, the locking member co-operates with the lateral faces of its housing;
- the or each housing is connected to the outer surface of the body via a fillet or a chamfer extending beside the or each connecting portion;
- the guide means comprise at least one longitudinal groove formed in the body and suitable for housing the connecting portion and/or the control portion so as to laterally guide the locking member;
- the or each groove presents a flat bottom;
- the control portion forms a radial protrusion suitable for co-operating in abutment with a shoulder formed on the annular element;
- a washer is placed between the resilient member and the or each control portion;
- the body includes an axial abutment suitable for co-operating with the annular element to limit the movement of the annular element in the direction for unlocking the locking member; and the female element includes a plurality of distinct locking members.

Furthermore, the invention provides a coupling for joining together two pipes, the coupling including a male element and being characterized in that it includes a female element as set out above.

According to other characteristics of the invention that are advantageous, but optional, whether taken in isolation or in any technically feasible combination:

the male element presents a surface of revolution suitable for co-operating with the locking member so as to block the male element in the body along said axis.

the distal portion of the locking groove presents a substantially frustoconical shape about said axis with generator lines that are inclined relative to said axis at an angle lying in the range 40° to 50°.

BRIEF DESCRIPTION OF THE DRAWINGS

The invention can be well understood and other advantages thereof also appear in the light of the following description given purely by way of example and made with reference to the accompanying drawings, in which.

DESCRIPTION OF THE PREFERRED EMBODIMENTS

Figure 1:
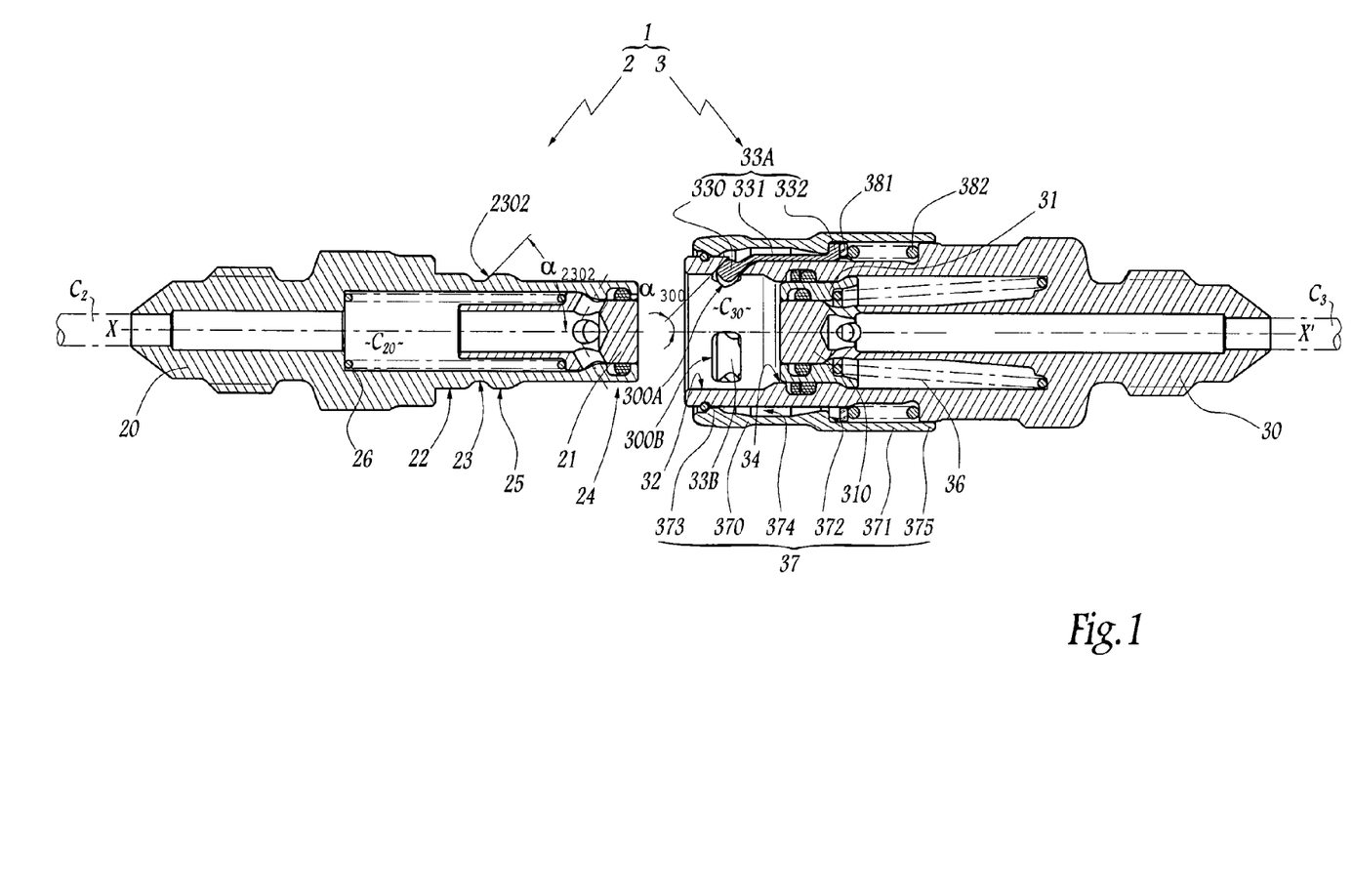
FIG. 1 is an axial section of a coupling in accordance with the invention shown in the uncoupled position and including a female element in accordance with the invention.

FIG. 1 shows a connector or coupling 1 in the uncoupled position comprising a male element 2, constituting the male element of the coupling 1, together with a female element 3. The male element 2 is connected to a fluid pipe $C_2$ drawn in chain-dotted lines, and the female element 3 is connected to a fluid pipe $C_3$, likewise drawn in chain-dotted lines. The body 20 of the male element 2 defines a longitudinal duct $C_{20}$ through which the fluid can flow. The outside surface of the male element 2 is a surface of revolution about an axis X-X' that corresponds to the direction in which the male element 2 engages in the female element 3. The outer radial surface of the male element 2 has a proximal portion 22 and a distal portion 24, there being an annular groove 23 and an annular collar 25 between them.

A surface is herein referred to as being "radial" or "axial" depending on the orientation of a normal to said surface relative to the axis X-X'. Furthermore, a radial surface is said to be "inner" if it faces towards the axis X-X' and "outer" if it faces the other way. The adjective "proximal" designates an element of a part close to the pipe to which the coupling element associated with said part is connected, while the adjective "distal" designates an element of the part that is further away therefrom.

The groove 23 presents an outer distal surface 2302 of substantially frustoconical shape, having a generator line inclined relative to the axis X-X' by an angle $\alpha_{2302}$ of about 45°. In practice, the angle $\alpha_{2302}$ of the groove 23 may lie in the range 30° to 60°.

The body 30 of the female element 3 defines a duct $C_{30}$ of shape that is complementary to the proximal and distal portions 22 and 24 of the body 20 of the male element 2, so as to enable the coupling 1 to couple together. The duct $C_{30}$ presents the form of a body of revolution about the axis X-X'. The duct $C_{30}$ has a distal bore 32 and a proximal bore 34 both formed in the body 30, the bores having diameters that correspond, respectively and ignoring clearances, to the diameters of the proximal and distal portions 22 and 24 of the male element 2.

The male element 2 is coupled in the female element 3 by moving one and/or the other of these two parts along the axis X-X'. In the uncoupled position shown in FIG. 1, the male element 2 and the duct $C_{30}$ extend axially along the axis X-X'. The duct $C_{20}$ is closed by a shutter 21 situated at its distal end, and the duct $C_{30}$ is closed by a shutter 31.

The shutters 21 and 31 are mounted to move in translation along the axis X-X'. During coupling of the coupling 1, the shutter 21 encounters a stationary pusher 310 that pushes it towards the proximal portion of the duct $C_{20}$, while the shutter 31 is pushed back by the distal axial face of the body 20 towards the proximal portion of the duct $C_{30}$. The shutters 21 and 31 respectively push back two compression springs 26 and 36. The springs 26 and 36 exert respective resilient return forces on the shutters 21 and 31 urging them towards their respective positions for closing the ducts $C_{20}$ and $C_{30}$.

Figure 6:
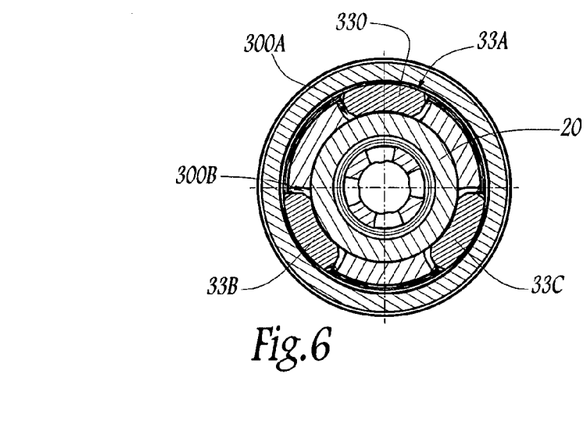
FIG. 6 is a section on line VI-VI of FIG. 5.

The female element 3 has three locking members for locking the coupling in the coupled position. Two of these members are visible in FIG. 1 with references 33A and 33B, the third being visible in FIGS. 4 and 6 with reference 33C. These locking members are identical to one another, such that only the member 33A is described in detail below. In this example the members 33A, 33B, and 33C form three distinct parts.

The member 33A extends generally along the axis X-X' and presents three distinct portions, namely a distal or "locking" portion 330, a proximal or "control" portion 332, and an intermediate or "connecting" portion 331. The portion 330 is said to be a locking portion because it is involved in locking the male element 2 in the female element 3 as described in detail below. The portion 332 is said to be a control portion because it is involved in moving the member 33A relative to the body 30. The portion 331 is said to be a connecting portion because it is situated between the portions 330 and 332.

Figure 2:
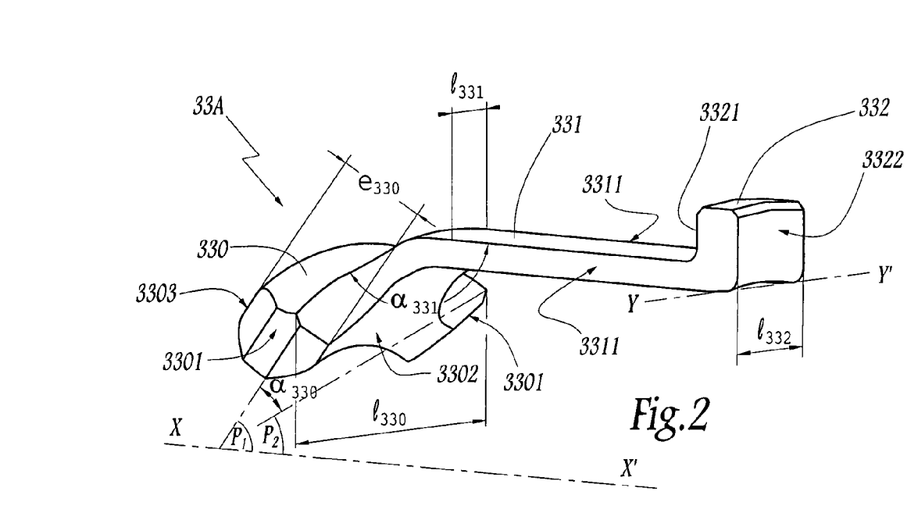
FIG. 2 is a perspective view on a larger scale of the locking member of the female element shown in FIG. 1.

As shown in FIG. 2, the locking portion 330 is in the form of a portion of a toroid about the axis X-X', this portion being defined by two meridian planes $P_1$ and $P_2$. The term "toroid" is used to designate a volume of revolution generated by a circumference being turned about an axis situated in its plane, such as the axis X-X', and not intersecting the circumference. The planes $P_1$ and $P_2$ form between them an angle $\alpha_{330}$ that is centered on the axis X-X' and that is equal to about 60°. In practice, the angle $\alpha_{330}$ may lie in the range 30° to 80°.

The locking portion 330 has two frustoconical surfaces of revolution, namely an inner proximal surface 3302 and an outer distal surface 3303. The surfaces 3302 and 3303 are defined by the meridian planes $P_1$ and $P_2$ and thus extend at an angle substantially equal to the angle $\alpha_{330}$. In addition, the generator lines of the proximal and distal surfaces 3302 and 3303 form respective angles $\alpha_{3302}$ and $\alpha_{3303}$ with the axis X-X'. Specifically, the angles $\alpha_{3302}$ and $\alpha_{3303}$ are substantially equal to each other.

Similarly, the connecting portion 331 and the control portion 332 are formed by portions of volumes of revolution about the axis X-X'. Nevertheless, these portions are defined angularly by two parallel planes and they are of smaller extent than the locking portion 330, such that the widths $l_{332}$ and $l_{331}$ of the portions 332 and 331, in this example equal in a circumferential direction, are significantly smaller than the width $l_{330}$ of the portion 330. The term "circumferential" is used to designate a direction that is orthogonal both to the axial direction of the axis X-X', and to the radial directions. A circumferential direction is perpendicular to the plane of FIG. 1, for example. The width $l_{332}$, like the width $l_{331}$ is equal to 1.5 millimeters (mm) in this example, while the width $l_{330}$ is equal to 4.5 mm. Furthermore, the locking portion 330 presents a thickness $e_{330}$ of about 1.2 mm, which thickness is considerably smaller than its width $l_{330}$, specifically by a factor of 3.75. Overall, the member 33A is made up of portions of volumes of revolution that are connected to one another.

In a variant that is not shown and unlike the embodiment shown, the locking members of the female element have control portions that are formed by a control ring of annular shape that is common to all of the locking members. In other words, in addition to a locking portion and a connecting portion, each locking member comprises a control portion that is common to the other locking members. These locking members are thus connected to one another and together form a single part, whereas the members 33A, 33B, and 33C form three distinct parts. The locking portions and the connecting portions thereof are similar to the corresponding portions described above with reference to the figures. The annular control ring is generally in the form of a body of revolution about the coupling axis of the coupling. It may be generally toroidal in shape or in the form of a cylinder having a circular base.

Similarly, in this variant, the width in a circumferential direction of each connecting portion is less than the width of each locking portion, thereby limiting the radial size of the female element. In addition, this structure makes it easier to pivot each locking member. Each connecting portion is indeed suitable for deforming in bending under the effect of the forces exerted on the corresponding locking portion, while the common control portion moves essentially in translation along the coupling axis and around the body of the female element. Furthermore, the maximum width, in a circumferential direction, corresponds to the circumference of the control ring.

The female element 3 also includes a control ring 37 in the form of an annular element surrounding the distal portion of the female element 3. The ring 37 comprises a distal portion 370 and a proximal portion 371 that are mounted on the body 30 so as to freely slide and pivot, in particular by virtue of annular seats 373 and 375. The ring 37 is in the form of a body of revolution about the axis X-X' and the inner radial surface of its distal portion 370 defines a housing 374 suitable for receiving the connecting portion 331 and the locking portion 330 of the member 333A in the unlocked position, or for receiving the corresponding portions of the member 33B or 33C. A shoulder 372 is formed at the junction between the distal and proximal portions 370 and 371. The shoulder 372 can bear against the control portion 332 of the member 33A, projecting radially from the connecting portion 331, such that the ring 37 is suitable for driving the members 33A, 33B, and 33C towards the pipe $C_3$ when the ring 37 is moved towards the pipe $C_3$.

Figure 3:
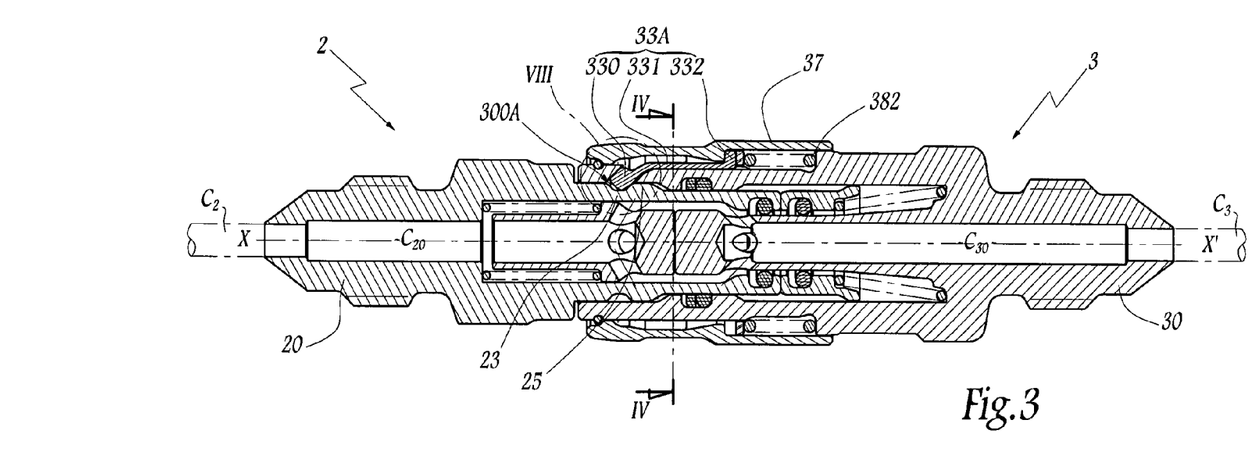
FIG. 3 is a view analogous to FIG. 1 showing the coupling of FIG. 1 shown in the coupled-together position.
Figure 5:
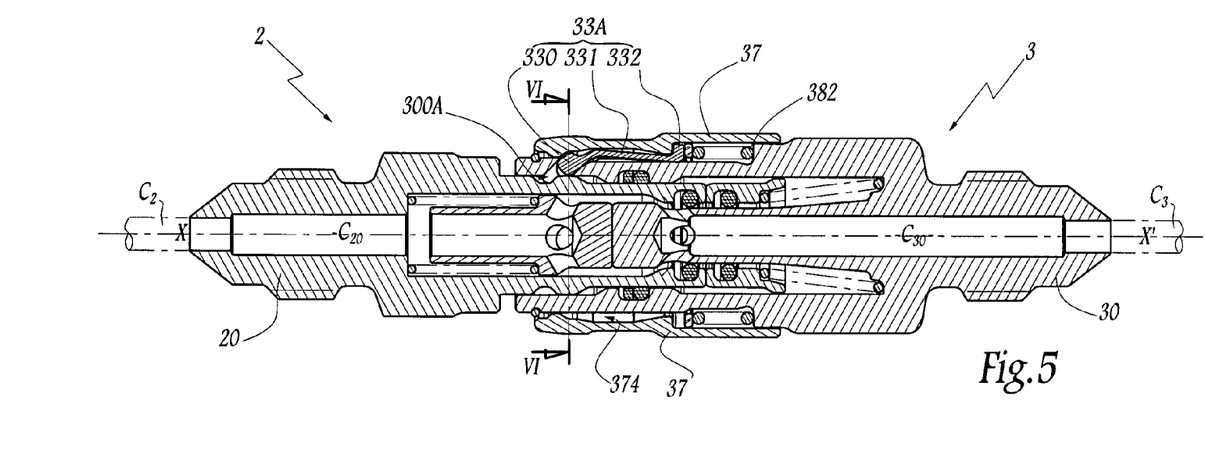
FIG. 5 is a view analogous to FIG. 3 showing the FIG. 3 coupling in an intermediate position.

The member 33A is mounted to move between a locked position in which the locking portion 330 holds the male element 2 on the axis X-X' within the body 30, as shown in FIG. 3, and an unlocked position in which the locking portion 330 releases the passage for the male element 2 in the duct $C_{30}$, as shown in FIG. 5. The member 33A is driven towards its unlocked position by the ring 37, with its shoulder 372 exerting a force on the control portion 332 along the axis X-X' going towards the pipe $C_3$.

Figure 8:
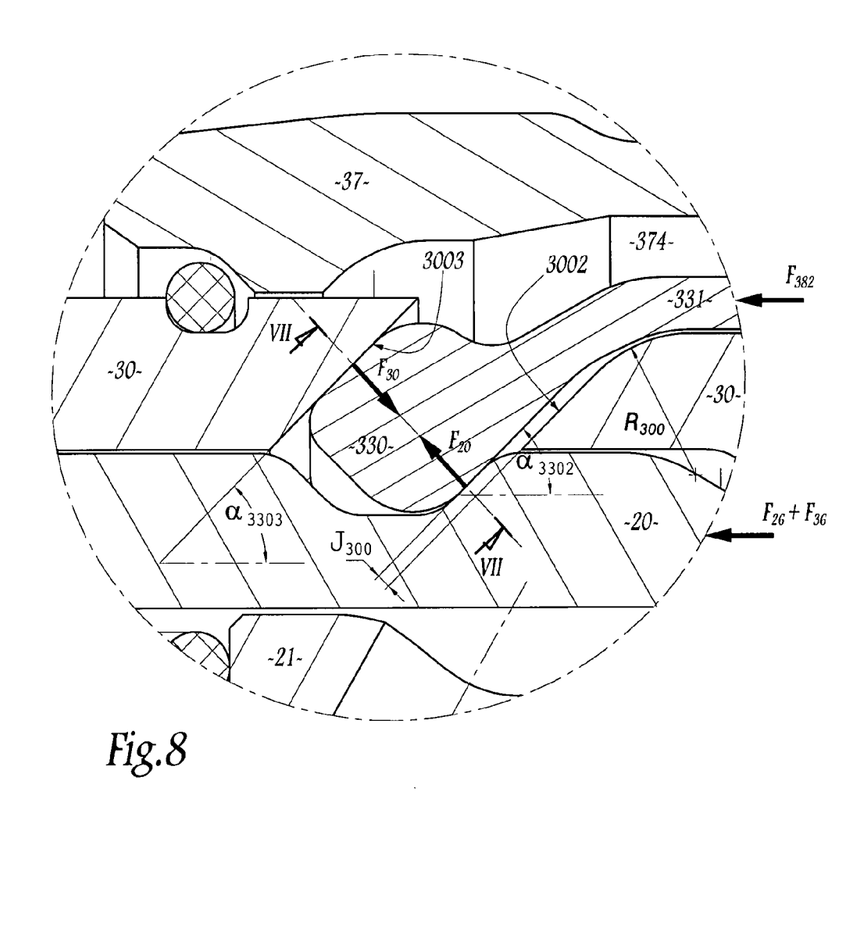
FIG. 8 is a view on a larger scale of a detail VIII of FIG. 3.

A compression spring 382 is housed between the body 30 and the proximal element 371 of the ring 37, and it exerts a resilient return force $F_{382}$, shown symbolically in FIG. 8, urging the member 33A towards its locked position. A washer 381 is mounted between the spring 382 and the control portion 332 in order to distribute the force exerted by the spring 382 uniformly over the control portions of the 332 type of the members 33A, 33B, and 33C.

The distal portion of the body 30 includes identical housings, two of which can be seen in FIG. 1 with references 300A and 300B, for receiving the respective locking portions 330 of the member 33A and of the member 33B. The connecting portion 331 and the control portion 332 are generally located at, and specifically around, the outer radial surface of the body 30. The dimensions of the housing 300A allow the member 33A to be disengaged towards its unlocked position. Each housing of the type 300A and 300B is constituted by a slot passing through the body 30. The housing 300A is connected to the outer surface of the body 30 via a fillet of radius $R_{300}$ extending beside the connecting portion 331. In a variant, some other type of connection could be provided, such as a chamfer.

Figure 7:
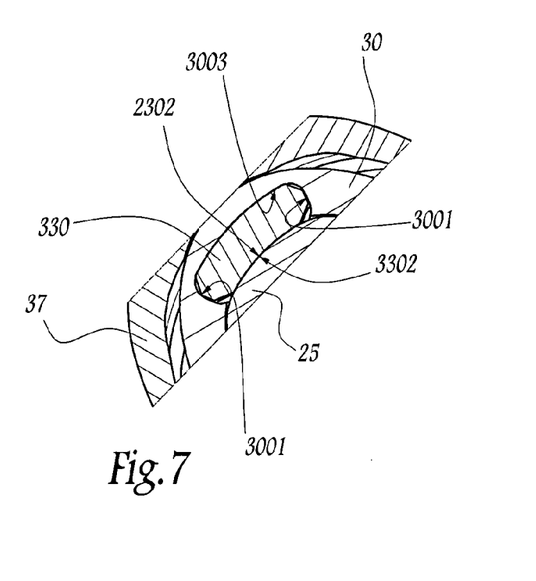
FIG. 7 is a section on line VII-VII of FIG. 8 showing a portion of the FIG. 3 female element.

The shape of the housing 300A enables the locking portion 330 to penetrate, at least in part, into the volume defined by the distal portion of the duct $C_{30}$ and thus to dock the male element 2. As shown in FIG. 7, a housing of the type 300 is defined firstly by a distal frustoconical surface 3003 extending over an angle $\alpha_{300}$ of about 45° relative to the axis X-X', a generator line of the distal frustoconical surface 3003 and the axis X-X' converging towards the distal end of the female element 3. In practice, the angle $\alpha_{300}$ may lie in the range 30° to 60°. The angle $\alpha_{300}$ is substantially equal to the angle $\alpha_{3303}$ of the distal surface 3303 of the locking portion 330, so as to enable the surface 3003 to co-operate with a corresponding surface of the locking portion 330. The housing 300 is also defined by a surface 3002 forming an angle substantially equal to the angle $\alpha_{3302}$ with the axis X-X'. It should be observed that the proximal surface 3002 may optionally be frustoconical in shape.

As shown in FIG. 2, the locking portion 330 forms a bend having an angle $\alpha_{331}$ relative to the connecting portion 331. The angle $\alpha_{331}$ is about 135°. In practice, the angle $\alpha_{331}$ may lie in the range 120° to 150° depending on the value of the angle $\alpha_{3302}$. The angle $\alpha_{331}$ is thus complementary to the angle $\alpha_{300}$ of the housing 300A. Thus, in the locked position of the member 33A, i.e. when its distal surface 3303 is in contact with the distal surface 3003 of the hosing 300A, the connecting portion 331 extends generally along the axis X-X', thereby providing good radial compactness to the female element 3. A fillet serves to distribute the mechanical stresses transmitted between the portions 330 and 331, and thus presents good resistance to these stresses.

As shown in FIGS. 7 and 8, in the locked position the proximal surface 3302 of the locking portion 330 is in surface contact with the distal surface 2302 of the groove 23. This distal surface 2302 is a surface of revolution. The angle $\alpha_{2302}$ of the distal surface 2302 is equal to the angle $\alpha_{3302}$ of the proximal surface 3302, and thus to the angle $\alpha_{3303}$ of the distal surface 3303, so as to achieve contacts over a large area.

When the female element 3 is in the coupled position on the male element 2, loads are transmitted mainly via these contact surfaces. Insofar as the contact area is relatively large, bruising of the surface of the male element 2 by each locking member 33A, etc., is reduced or even eliminated. The service life and the reliability of the coupling of the invention are thus increased.

Figure 4:
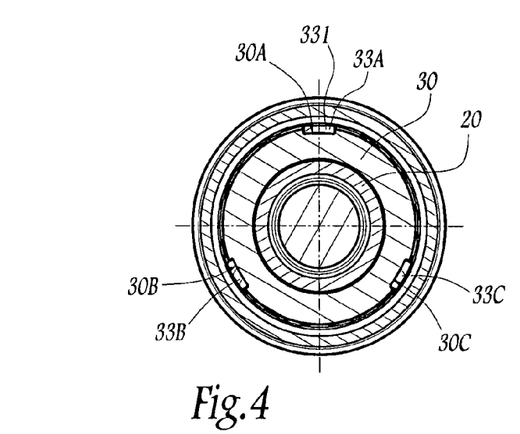
FIG. 4 is a section on line IV-IV of FIG. 3.

The outer surface of the body 30 presents three longitudinal or axial grooves 30A, 30B, and 30C, each suitable for receiving the connecting portion of the 331 type and the control portion of the 332 type of one of the locking members 33A, 33B, and 33C. As shown in FIG. 4, each groove 30A to 30C has a flat bottom, lateral faces or sides that are mutually parallel and perpendicular to the flat bottom, and a width complementary to the width of the type 331 connecting portions and the type 332 control portions. The connecting portion 331 and the control portion 332 of each member of type 33 are thus guided laterally by the sides of the grooves 30A to 30C during movements of the locking members 33A to 33C. The term "lateral" is used to designate a direction that is substantially circumferential.

In practice, the sides of the grooves 30A form lateral guide means for the parallel lateral faces 3311 of the connecting portion 331 and the parallel lateral faces of the control portion 332. The lateral faces of the portion 332 thus extend respectively in the same planes as the lateral faces 3311 of the portion 331. In other words, the lateral faces of the portion 332 extend the lateral faces 3311. In a variant, only the connecting portion 331 or the control portion 332 is guided laterally by the grooves 30A to 30C.

As shown in FIG. 2, the locking portion 330 presents lateral faces 3301 that diverge going away from the duct $C_{30}$ and the axis X-X', thereby making it easier to disengage the member 33A radially from its position locked in the housing 300A. For the same purpose, the housing 300A presents lateral faces 3001 that diverge going away from the axis X-X'. This radial disengagement is made possible by the member 33A pivoting a little about an axis Y-Y' that is shown in FIG. 2 and that is situated at the contact between the control portion 332 and the bottom of the groove 30A and that is perpendicular to the plane of FIG. 5.

In the locked position, the member 33A co-operates substantially with the housing 300A, particularly via its lateral and distal surfaces 3301 and 3303. A small amount of clearance $J_{300}$ is provided between the proximal surfaces 3302 and 3002. Such a shape for the components of the coupling 1 thus makes it easier to engage and disengage the locking member 33A in the housing 300A.

The groove 30A thus forms lateral guide means for the member 33A, and more particularly for its control portion 332 and for the proximal end of its connecting portion 331 in a combined movement of pivoting about the axis Y-Y' and moving in translation along the axis X-X', thereby keeping the longitudinal orientation of the member 33A unchanged and conserving the accuracy with which it is positioned, in spite of the increase in clearance between the housing 300A and the diverging lateral faces 3301 of the locking portion 330. Alternatively, longitudinal guide grooves can be formed in the ring 37, which is then constrained to turn with the body 30. In other words, the portions 331 and 332 are suitable for being guided laterally in the groove 30A.

During coupling, the male element 2 is taken from its position shown in FIG. 1 to its locked position, as shown in FIG. 3. The distal annular surface 24 engages in the proximal bore 34, and the collar 25 comes into abutment against the member 33A, which is in its locked position under thrust from the spring 382. The collar 25 then exerts a force on the locking portion 330, thereby causing the member 33A to pivot and move back in translation in the groove 30A along the axis X-X' towards the pipe $C_3$. Movement of the member 33A in translation causes the washer 381 to move in translation together with the ring 37 that is secured thereto, via the control portion 332 and against the force $F_{382}$ exerted by the spring 382. The locking portion 330 is thus retracted away from the passage for the male element 2 in the duct $C_{30}$. The movement of the member 33A between the locked and unlocked positions, made up of movement in pivoting and in translation, is guided laterally by the groove 30A.

When the male element 2 reaches its coupling position, in which the shutters 21 and 31 have been pushed back against the compression springs 36 and 26 so that the fluid can flow, the member 33A is pushed into the duct $C_{30}$, towards the groove 23 by the spring 382 via the washer 381. The spring 382 pushes the member 33A along the axis X-X' and causes it to pivot until the connecting portion 331 comes into abutment in a substantially axial position against the bottom of the groove 30A and until the locking portion 330 becomes interposed between the body 30 and the distal surface 2302 of the groove 23. The member 33A is then in the locked position and blocks the male element 2 axially in the female element 3, preventing it from being withdrawn from the female element 3. The coupling couples automatically and there is no need for the operator to actuate the ring 37.

In operation, the male element 2 is subjected to uncoupling forces exerted for example by the springs 26 and 36 or by the fluid flowing in the ducts $C_{20}$ and $C_{30}$. Nevertheless, as shown in FIG. 8, the forces $F_{382}$, $F_{26}$ and $F_{36}$ exerted by the springs 382, 26 and 36 on the male element 2, and any retraction force of the male element 2 all contribute to pressing the male element 2 against the locking portion 330 and the locking portion 330 against the body 30. Indeed, the forces $F_{20}$ and $F_{30}$ exerted by the male element 2 and the body 30 on the member 33A are applied on surfaces that are frustoconical and of the same orientation, thereby contributing to holding the member 33A by "wedging" in the locked position. The angle of inclination of these surfaces is substantially 45° and provides optimal wedging of the portion 330.

Insofar as the locking portion 330 of each member 33A, 33B or 33C extends over an angular sector of about 60°, matching with the angle $\alpha_{330}$ defined by the meridian planes $P_1$ and $P_2$, the contact area between the body 20 and the three members 33A, 33B and 33C occupy about 180° in total angular sector, i.e. half of the frustoconical surface of the distal surface 2302 of the groove 23. Similarly, the contact area between the body 30 and the three members 33A, 33B and 33C occupy about 180° in total angular sector. Consequently, bruising of the male element 2 and of the body of the female element 3 is greatly reduced, while its service life and reliability are increased compared with prior art couplings.

In addition, the radial compactness of the female element 3 remains substantially unchanged in spite of this increase in contact area compared with prior art female elements. Similarly, the axial compactness of the female element 3 is unaffected, insofar as the locking portion 330 presents a thickness $e_{330}$ that is much less than its width $l_{330}$. Similarly, the widths $l_{332}$ and $l_{331}$, which are relatively small compared with the width $l_{330}$, require a relatively shallow groove 30A for guiding the portions 331 and 332, thereby avoiding, for equivalent contact area between the male element and the locking member, weakening of the body 30 while awarding a relatively high radial compactness to the female element 3.

The angle $\alpha_{330}$ defining the angular extent of the locking portion 330 is selected to optimize the mechanical strength of the parts of the coupling. An angle $\alpha_{330}$ of about 60° thus makes it possible to ensure a relatively large contact area so as to reduce bruising of the male element 2 and of the female element 3, while avoiding weakening the body 30, which is subjected to the locking and operating loads, by limiting the extent of housings 300A or 300B. The toroidal shape of the locking portion 330 with same-orientation surfaces 3302 and 3303 serves to limit weakening of the body 30 while ensuring a large contact area between the member 33A and the male element 2.

In the coupled position and during coupling or uncoupling stages, when the male and female elements 2 and 3 turn relative to each other about the axis X-X', or if the ring 37 is caused to turn, the lateral guide of each member 33A, 33B, or 33C by a housing of the type 300A, 300B, or 300C and/or by the grooves 30A to 30C, serves to avoid any critical deformation of the member 33A, 33B, or 33C in its narrow portions 331 and 332. Thus, the member 33A keeps its longitudinal alignment, causing the member 33A to move without jamming and for the purpose of providing good axial locking of the male element 2. The parallel lateral guide surfaces indeed provide good guide and good transmission to the body 30 of the lateral forces to which each locking member is subjected.

In order to uncouple the coupling, an operator moves the ring 37 in the direction for unlocking the member 33A, i.e. pushes the ring against the spring 382 and the springs 26 and 36 towards the pipe $C_3$, the ring 37 driving therewith the member 33A via its control portion 332. Actuating the ring 37 consists in advancing the male element 2 slightly towards the pipe $C_3$ so as to reduce the clearance $J_{300}$, thereby enabling the member 33A to move and thus become disengaged. Moving the member 33A back towards the pipe $C_3$ places it in a position in which it can pivot. The member 33A moves between the locked position and the unlocked position with combined movement in translation along the axis X-X' and pivoting substantially about the axis Y-Y'. The locking portion 330 then retracts out from the groove 23 and from the path of the male element 2 in the duct $C_{30}$, towards the housing 374. The toroidal shape of the locking portion 330, and in particular the surface of revolution 3303 make it easier for the member 33A to move in the housing 300A.

The male element 2 is withdrawn from the female element 3 under the combined actions of an operator and the forces closing the shutters 21 and 31 as exerted by the springs 26 and 36. When the male element 2 is withdrawn and the ring 37 released, the spring 382 pushes the member 33A towards the duct $C_{30}$ into the locked position, which it reaches when its portion 331 comes into abutment against the bottom of the groove 30A and the surface 3303 remains in contact with the surface 3003.

As shown in FIG. 5, when the member 33A pivots relative to the locked position, the connecting portion 331 leaves the groove 30A in part, and the control portion 332 remains in contact with the shoulder 372.

The contact of the shoulder 372 on the control portion 332 takes place between a distal surface 3321 of the control portion 332 of width $l_{332}$ and a proximal surface of the shoulder 372 of angular shape. The position in the radial direction of this contact relative to the axis X-X' thus depends on the width $l_{332}$. The position of the axis Y-Y' depends on the shape of the bottom and on the depth of the groove 30A. The axis Y-Y' is beside a proximal axial surface 3332 of the control portion 332. Since the bottom of the groove 30A is flat, the axis Y-Y' is closer to the axis X-X' than it would be if the bottom were rounded, since contact between the rounded inner surfaces of the portions 331 and 332 takes place against the bottom of the groove 30A.

The shape of the bottom, the depth of the groove 30A, and the small width $l_{332}$ cause the contacts between the ring 37 and the member 33A to be situated beyond and away from the pivot axis Y-Y' of the member 33A, going away from the axis X-X'. Consequently, these contact points enable the member 33A to be pivoted effectively in the unlocking direction by the ring 37.

In a variant that is not shown, the body 30 of the female element 3 may include an axial abutment suitable for co-operating with the ring 37 to limit its reverse movement towards the pipe $C_{30}$ and thus limit the movement of the locking member towards its unlocked position. This can limit the reverse movement of the locking member and thus the stresses to which it is subjected.

In another variant that is not shown, the ring need not follow the movement in translation of the locking member during coupling. For this purpose, the washer needs to be free to move without the ring against the return spring when the locking member is pushed back by the collar on the male element during engagement, and then to push the locking member towards the locked position under drive from the spring.

The invention claimed is:

1. A female element of a coupling, the female element comprising:
    a body having a duct for receiving a male element along a coupling axis (X-X') of the coupling;
    at least one locking member including a locking portion for contacting the male element, a connecting portion, and a control portion connected to the locking portion via the connecting portion, the locking member extending generally along the axis (X-X') and being movable with combined movement in pivoting (Y-Y') and in translation along the axis (X-X') between a locked position in which the locking portion retains the male element in the body (30) along the axis (X-X'), and an unlocked position in which the locking portion releases the male element so that it is movable within the duct;
    an annular element (37) for moving the at least one locking member (33A, 33B, 33C) from the locked position to the unlocked position; and
    at least one resilient member for returning the at least one locking member to the locked position;
    the female element including longitudinally extending lateral guide means for guiding the connecting portion and the control portion during movement of the locking member, a surface of the locking portion that engages with the male element having a shape of a portion of a surface of revolution about the axis (X-X'), at least one of the control portion and the connection portion of the at least one locking member has a width in a circumferential direction (Y-Y') of the control portion (332) and of the connecting portion which is less than a width of the locking portion of the at least one locking member.

2. The female element according to claim 1, wherein the portion of the surface of revolution extends over a sector of angle ($\alpha_{330}$) of at least 30° relative to the axis (X-X').

3. The female element according to claim 1, wherein the locking portion has a shape of a portion of a volume of revolution.

4. The female element according to claim 3, wherein the portion of a volume of revolution is formed by two frusto-conical surfaces having respective generator lines that are inclined relative to the axis (X-X') at respective angles ($\alpha_{3302}$, $\alpha_{3303}$) lying in a range of 30° to 60°.

5. The female element according to claim 1, wherein the locking portion has a width ($l_{330}$) that is greater than its thickness ($e_{330}$)

6. The female element according to claim 1, wherein lateral faces of the locking portion diverge ($\alpha_{330}$) going away from the duct.

7. The female element according to claim 1, wherein the body includes a through housing for the locking portion, and in that the control portion and the connecting portion are placed at the outer surface of the body of the female element.

8. The female element according to claim 7, wherein, in the locked position, the locking member co-operates with lateral faces of its housing.

9. The female element according to claim 1, wherein the guide means is at least one longitudinal groove formed in the body and in which the connecting portion and the control portion are seated so as to laterally guide the locking member.

10. The female element according to claim 9, wherein the groove has a flat bottom.

11. The female element according to claim 1, wherein the control portion forms a radial protrusion for co-operating in abutment with a shoulder formed on the annular element.

12. The female element according to claim 1, wherein a washer is placed between the resilient member and the control portion.

13. The female element according to claim 1, wherein the body includes an axial abutment for co-operating with the annular element to limit movement of the annular element in a direction for unlocking the at least one locking member.

14. The female element according to claim 1, including a plurality of distinct locking members.

15. The coupling for joining two pipes together, the coupling including a male element and a female element according to claim 1.

* * * * *